United States Patent Office
3,236,790
Patented Feb. 22, 1966

3,236,790
POLYURETHANES FROM A ROSIN ACID
POLYETHER-ESTER
John F. Szabat, Pittsburgh, Pa., assignor to Mobay Chemical Company, Pittsburgh, Pa., a corporation of Delaware
No Drawing. Filed Nov. 28, 1962, Ser. No. 240,720
9 Claims. (Cl. 260—2.5)

This invention relates to polyurethanes and more particularly to improved polyurethanes based on low cost raw materials which have good physical properties and particularly polyurethane foam having good dimensional stability and flame-resistance.

The production of polyurethanes by the reaction between various resinous materials containing active hydrogen containing groups and an organic polyisocyanate is well known. The polyester type of resinous material which has terminal hydroxyl groups produces particularly advantageous properties in the final polymer structure, but the polyesters are expensive and, for example in the preparation of polyurethane foam, do not have satisfactory flame-resistance in the absence of special additives.

It has been proposed heretofore to prepare polyesters by reacting tall oil which is a mixture of fatty acids and rosin acids with a polyhydric alcohol to prepare a polyester which may be used for the production of polyurethane plastics by reaction thereof with an organic polyisocyanate in the presence of a blowing agent. These polyesters are very economical in comparison with polyesters based on refined materials but the resulting polyurethane foams often do not have satisfactory dimensional stability and flame-resistance.

It is therefore an object of this invention to provide polyurethanes and an ester for the production thereof which is substantially devoid of the foregoing disadvantages. Another object of this invention is to provide an improved ester for the production of polyurethane foam. Still a further object of this invention is to provide esters based on rosin acids and polyhydric alcohols. A further object of this invention is to provide an improved flame-resistant polyurethane foam based on certain components which are relatively easy to mix together to bring about the production of a polyurethane foam plastic and which yield a polyurethane foam having improved physical properties. Still another object of this invention is to provide a relatively low cost resinous material adapted for the production of polyurethane foam which has improved dimensional stability and flame-resistance.

The foregoing objects and others which will become apparent from the following description are accomplished in accordance with the invention, generally speaking, by providing polyurethanes prepared from an organic polyisocyanate and an hydroxyl polyether-ester prepared by reacting a rosin acid with a polyhydric alcohol containing from 3 to 8 free hydroxyl groups in a first step to produce a polyester and reacting the resulting polyester with from 1 to 32 mols of an alkylene oxide. Of course, if the reaction is carried out in the presence of a blowing agent, a foamed structure is produced. Thus, this invention contemplates reacting rosin acid, and preferably abietic acid and isomers thereof, with a polyhydric alcohol having from 3 to 8 free hydroxyl groups in such relative amounts that a product containing at least two free hydroxyl groups is obtained and then reacting the resulting ester with from about 1 to about 32 mols of alkylene oxide to obtain an hydroxyl polyether-ester having an hydroxyl number within the range of from about 76 to about 640 and a molecular weight within the range of from about 614 to about 2200. The invention also contemplates the reaction of mixtures of the hydroxyl polyether-ester with organic compounds containing at least two active hydrogen containing groups as determined by the Zerewitinoff method and preferably alkylene oxide adducts of amines with organic polyisocyanates. It is preferred to use at least about 75 percent by weight of the hydroxyl polyether-ester based on the total weight of the resin mixture.

Any suitable rosin acid may be used such as, for example, abietic acid, dehydroabietic acid, tetrahydroabietic acid, levopimaric acid, D-pimaric acid, neoabietic acid and the like. Of course, it is not necessary to use refined abietic acid but it is preferred that the rosin acid or mixtures of rosin acids which are used in the preparation of the initial ester contain at least about 97 percent by weight of abietic acid or an hydrogenation product thereof. Still further, it is not necessary to begin with an abietic acid but modified rosin known as ester gum and made by the partial esterification of rosin with a polyhydric alcohol having at least four hydroxyl groups may be used. Still further, the ester may be made by reacting a partial polymerization product of rosin acid with a polyhydric alcohol from 3 to 8 hydroxyl groups such as, for example, the modified material known as "Poly-pale Resin." This material is prepared by the dienic polymerization of abietic acid units.

Any suitable polyhydric alcohol having from 3 to 8 hydroxyl groups may be used such as, for example, glycerine, trimethylolpropane, pentaerythritol, penitol, sorbitol, dulcitol, perseitol, sucrose and the like. It is preferred to use polyhydric alcohols which contain from 4 to 6 free hydroxyl groups.

Any suitable alkylene oxide may be used for reaction with the partial esterification product of the polyhydric alcohol such as, for example, ethylene oxide, 1,2-propylene oxide, 1,2-butylene oxide, 1,2-amylene oxide, styrene oxide, epichlorohydrin and the like. It is preferred to use alkylene oxides which contain from 2 to 5 carbon atoms. The alkylene oxide is reacted in such an amount of from about 1 to about 32 mols per hydroxyl group and preferably only from 2 to 5 mols of alkylene oxide are used per hydroxyl group because greater amounts of alkylene oxide impart flexibility to the resulting polyurethane foam so that it is not suitable in the most desirable application of the polyurethane foam of the invention, namely the production of substantially rigid urethane foam insulation.

Any suitable organic compound containing at least two active hydrogen containing groups as determined by the Zerewitinoff method, said groups being reactive with an isocyanate group, may be mixed with the hydroxyl polyether-esters and reacted with an organic polyisocyanate in accordance with the process of the present invention. The active hydrogen atoms are usually attached to oxygen, nitrogen or sulfur atoms. Thus, suitable active hydrogen containing groups as determined by the Zerewitinoff method which are reactive with an isocyanate group include —OH, —NH$_2$, —NH—, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course, compounds which contain two or more different groups within the above-defined classes may also be used in accordance with the process of the present invention such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and a —SH group and the like.

The molecular weight of the organic compound containing at least two active hydrogen containing groups is not critical. Preferably, however, at least one of the organic compounds containing at least two active hydrogen containing groups which is used in the production of the polyurethane plastic has a molecular weight of at least about 200 and preferably between about 500 and about 5000 with an hydroxyl number within the range of from about 25 to about 800 and acid numbers, where applicable, below about 5. A satisfactory upper limit for the molecular weight of the organic compound containing at least two active hydrogen containing groups is about 10,000 but this limitation is not critical so long as satisfactory mixing of the organic compound containing at least two active hydrogen containing groups with the organic polyisocyanate and hydroxyl polyether-ester can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha,beta-diethyl succinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane doil, 1,3-pentane diol, 1,6-hexane diol, 1,7-heptane diol, glycerine, trimethylolpropane, 1,3,6-hexane triol, triethanol amine, pentaerythritol, sorbitol and the like.

Any suitable polyhydric polyalkylene ether may be used such as, for example, the condensation product of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylolpropane, pentaerythritol and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, volume 7, pages 257 to 262, published by Interscience Publishers, Inc. (1951), or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

In addition, there may be mentioned the use of diamines such as ethylene diamine and the like or amino carboxylic acids such as alanine for the production of the polyester amides or one may modify the polyesters with saturated or unsaturated fatty acids or fatty alcohols such as, for example, stearic acid, palmitic acid, lauryl alcohol or the like. Furthermore, the polyhydric polyalkylene ethers may be made by adding the alkylene oxides disclosed above to amino alcohols such as ethanol amine, diethanol amine, triethanol amine or the like or amines such as aniline, or alkylene diamines such as ethylene diamine, tetramethylene diamine, hexamethylene diamine and the like. Moreover, the above named alkylene oxides may be reacted with castor oil to produce a polyol suitable for mixture with the hydroxyl polyether-esters of the invention.

In accordance with still another preferred embodiment of the invention, the hydroxyl polyether-esters may be mixed with a flame-resisting amount of the reaction product of phosphoric acid and/or phosphorous acids with alkylene oxides or alkylene glycols to obtain a synegistic flame-resisting action. Suitable alkylene oxide or alkylene glycol addition products of phosphoric or phosphorous acids may be illustrated by the following formulas:

$$P\begin{pmatrix} O-R_a-H \\ O-R_b-H \\ O-R_c-H \end{pmatrix}$$

$$O=P\begin{pmatrix} O-R_a-H \\ O-R_b-H \\ O-R_c-H \end{pmatrix}$$

and/or

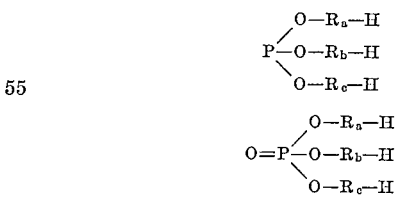

wherein $a$, $b$, $c$, $d$, $e$, and $f$ are numbers from 1 to 35, $n$ is a number between 0 and 20 and R is an alkoxy group which may be the same or different. Any suitable alkoxy group may be R in the foregoing formula such as that obtained by removing the hydroxyl group from ethylene glycol, 1,2-propylene glycol, 1,3-propylene glycol, 1,4-butane diol or the like. It is preferred that the alkoxy radicals represented by R in the foregoing formula contain 2 to 4 carbon atoms separating oxygen ether linkages.

It is preferred in the practice of the invention to employ a mixture of the hydroxyl polyether-ester with an alkylene oxide condensate of an amine such as, for example, the reaction product of from 3 to 6 mols of propylene oxide with ammonia, the reaction product of 4 mols of propylene oxide with ethylene diamine, i.e., N,N,N',N'-tetrakis-2-hydroxy propyl ethylene diamine, the reaction product of propylene oxide with a mixture of 80 percent 2,4- and 20 percent 2,6-toluylene diamine, the reaction product of propylene oxide with aniline and the like.

Any suitable organic polyisocyanate may be use such as, for example, ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, p,p', p''-triphenylmethane triisocyanate, 1,5-naphthalene diisocyanate, furfurylidene diisocyanate or polyisocyanates in a blocked or inactive form such as the bis-phenyl carbamates of 2,4- or 2,6-toluylene diisocyanate, p,p'-diphenylmethane diisocyanate, p-phenylene diisocyanate,1,5-naphthalene diisocyanate and the like. It is preferred to use the commercially available mixture of toluylene diisocyanates which contains 80 percent 2,4- and 20 percent 2,6-toluylene diisocyanate or 4,4'-diphenyl-methane diisocyanate.

Any suitable mixture of the aforementioned isocyanates as well as unrefined or crude isocyanates may also be used. For example, crude toluylene diisocyanates can be obtained by the phosgenation of a mixture of toluylene diamines and crude diphenylmethane diisocyanates can be obtained by the phosgenation of crude diphenylmethane diamine, the reaction product of aniline and formaldehyde in the presence of HCl. A preferred unrefined or crude isocyanate is one having from about 26 to about 33 percent free —NCO and an amine equivalent of from about 120 to about 160 such as, for example, a product having about 32 percent free —NCO and an amine equivalent of about 140. A specific crude isocyanate suitable for use in accordance with the present invention may be obtained by reacting about 60 parts of aniline with about 25 parts of formaldehyde (37 percent aqueous) and about 74 parts of HCl (30 percent aqueous) at a temperature of about 90° C. to about 100° C. for about 1.5 to about 2 hours and then reacting this product with NaOH and separating out the crude amine. About 100 parts of phosgene are then reacted with the crude amine until a product having an amine equivalent of about 135 and containing about 31 percent free —NCO is obtained. The free excess phosgene and substantially all of the solvents used, if any, are then removed. When toluylene diisocyanates, for example, are produced by conventional phosgenation of the corresponding diamines, a product containing about 90 percent 2,4- and 2,6-toluylene diisocyanate and the balance of crude residue of imidazoles and the like resulting in the phosgenation is obtained from the phosgenator. This product may also be used. It is preferred to phosgenate a mixture of ortho- and para-toluylene diamines. A specific product is the undistilled reaction mixture obtained by the phosgenation of 80 percent 2,4-toluylene diamine and 20 percent 2,6-toluylene diamine containing 90 percent of a mixture of about 80 percent 2,4-toluylene diisocyanate and 20 percent 2,6-toluylene diisocyanate and the balance polymers incapable of accurate analysis.

The invention contemplates the preparation of both porous and non-porous polyurethanes including coatings, castings, millable gums and the like.

It is often desirable in the production of the cellular polyurethane plastics of the invention to include a foam stabilizing substance such as, for example, sulphonated castor oil, dimethyl polysiloxanes or alkyl silane oxyalkylene block copolymers having the formula

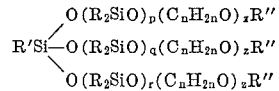

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

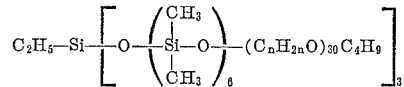

wherein $(C_nH_{2n}O)$ is a mixed polyoxyethylene and oxypropylene block copolymer containing about 17 oxyethylene units and about 13 oxypropylene units.

It is often desirable to include a catalyst in the reaction mixture such as, for example, a tertiary amine such as N-ethyl morpholine, N-methyl morpholine, diethyl ethanolamine, N-coco morpholine, 1-methyl-4-dimethylamino ethyl piperazine, dimethyl benzyl amine, triethylene diamine and the like as well as metal catalysts and particularly the organo tin catalysts such as, for example, dibutyl tin di-2-ethyl hexoate, dibutyl tin dilaurate, stannous octoate, stannous oleate and the like.

Of course, it is necessary to have a blowing agent in order to produce a satisfactory cellular structure. The blowing agent may be water which will react with an organic polyisocyanate to produce carbon dioxide and thus cause expansion of the resinous structure as it is formed. But, it is preferred to use a low boiling compound which causes expansion of the resinous material as it is formed because this is more economical than using the expensive diisocyanate to generate carbon dioxide and also, in most cases, the gas is entrapped and itself serves as an insulating material. This is particularly true where the halohydrocarbons are used such as, for example, dichlorodifluoromethane, trichlorofluoromethane and the like. It is also possible to use other blowing agents such as, for example, difluorochloroethane, difluorobromomethane, difluorodibromomethane, difluorodichloroethane, difluoro-1,2 - dichloroethylene, trifluorotrichloroethane, diethyl ether, pentane and the like.

Where a mixture of the hydroxyl polyether-ester and an alkylene oxide condensate of an amine are used, it is not usually necessary to have any additional catalyst present and this particular mixture, especially where the crude isocyanates referred to above are used, gives a flame-resistant, dimensional stable, rigid foam if the hydroxyl polyether-ester is prepared from 2 to 5 mols of alkylene oxide per hydroxyl group in the partial esterification product.

The invention is applicable to the preparation of coatings, caulks, sealants, castings, millable gums and the like. The coatings may be prepared by mixing the polyurethane prepared from the polyether-ester of the invention and an organic polyisocyanate in an inert organic solvent such as, for example, hydrocarbons including hexane, heptane, octane, benzene, toluene, xylene and the like as well as ester solvents such as ethyl acetate, ethylene glycol monoethyl ether acetate and the like.

The process of the invention can be used for the preparation of castings and the like set forth above by mixing an organic polyisocyanate with the polyether-ester preferably under substantially anhydrous conditions and casting the resulting mixture into a mold. It is preferred to prepare a prepolymer from the polyether-ester under substantially anhydrous conditions and then react it with an organic cross-linking agent or water. Suitable organic cross-linking agents are those which have a molecular weight below about 500 and which contain free hydrogen or other active hydrogen containing groups. Suitable solvents are, for example, 1,4-butane diol, the bis-(beta-hydroxy ethyl ether) of hydroquinone, ethylene glycol and the like.

The rigid polyurethane foams of the invention are useful particularly as both thermal and sound insulation in the preparation of wall panels, accoustical tile, building materials, refrigerators and the like. The non-porous polyurethanes may be used to prepare gear wheels or coatings for wood, metal and the like.

The invention is further illustrated by the following examples in which the parts are by weight unless otherwise indicated.

Example 1

About 100 parts of the hydroxyl polyether-ester having an hydroxyl number of about 224 and a viscosity at 25° C. of about 100,000 cps. and prepared by reacting the partial esterification product of about 100 parts of abietic acid with about 49.2 parts of pentaerythritol and about 150 parts of propylene oxide is mixed with about 36.7 parts of a mixture of 80 percent 2,4- and 20 percent 2,6-toluylene diisocyanate, about 25 parts of trichlorofluoromethane, about 2 parts of the silicone oil having the formula

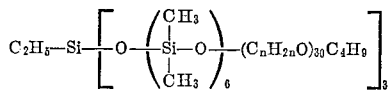

wherein ($C_nH_{2n}O$) is a mixed polyoxyethylene and oxypropylene block copolymer containing about 17 oxyethylene units and about 13 oxypropylene units and about 0.01 part of stannous octoate on a machine mixer as disclosed in Reissue Patent 24,514. The mixture flows from the machine directly into a paper-lined mold and rises in a few seconds to produce a substantially rigid cellular polyurethane foam plastic having a density of about 2 lbs/ft.$^3$.

Example 2

About 100 parts of the hydroxyl polyether-ester of Example 1 are mixed with about 56 parts of a crude 4,4'-diphenyl methane diisocyanate mixture containing about 30 percent —NCO and having an amine equivalent of about 141, said mixture being obtained by phosgenating the reaction product of aniline and formaldehyde reacted in the ratio of about 65 parts of aniline to about 25 parts of formaldehyde (37 percent aqueous) in the presence of about 74 parts of HCl (about 30 percent aqueous) at a temperature of about 90° C. to about 100° C. for about 1.5 to about 2 hours followed by neutralization with NaOH to obtain the crude amine which is phosgenated to obtain the mixture of isocyanates, about 25 parts of trichlorofluoromethane, about 1 part of the silicone oil used in Example 1 and about 0.5 part of stannous octoate are mixed on a machine mixer as disclosed in Example 1. The resulting polyurethane foam has a density of about 2 lbs./ft.$^3$.

Example 3

About 100 parts of an hydroxyl polyether-ester prepared by reacting the partial esterification product of about 100 parts of abietic acid with about 59.2 parts of pentaerythritol with about 172 parts of propylene oxide, said hydroxyl polyether-ester having an hydroxyl number of about 207 and a viscosity at about 25° C. of about 80,000 cps. is mixed with about 51 parts of the crude 4,4'-diphenyl methane diisocyanate mixture of Example 2, about 25 parts of trichlorofluoromethane, about 1 part of the silicone oil of Example 1 and about 0.5 part of stannous octoate on a machine mixer as disclosed in Example 1. The resulting foam has a density of about 2 lbs./ft.$^3$ and the following physical properties.

| | |
|---|---|
| Cell wall _____ percent__ | 2.8 |
| Open cells _____ do____ | 5.9 |
| Closed cells _____ do____ | 91.3 |
| Compressive strength: | |
|     At 2% deflection _____ lbs./in.$^2$__ | 3.8 |
|     At 5% deflection _____ lbs./in.$^2$__ | 11.1 |
|     At yield stress _____ lbs./in.$^2$__ | 12.1 |
|     Percent yield _____ | 6.0 |

Example 4

About 100 parts of the hydroxyl polyether-ester of Example 3 are mixed with about 62 parts of the mixture of toluylene diisocyanates of Example 1, about 25 parts of trichlorofluoromethane, about 1.0 part of the silicone oil of Example 1, about 0.5 part of stannous octoate and about 3 parts of water on a machine mixer as disclosed in Example 1. The resulting cellular polyurethane plastic has a density of about 2 lbs./ft.$^3$.

Example 5

About 50 parts of the hydroxyl polyether-ester of Example 3 are mixed with about 50 parts of a polyether prepared by reacting sorbitol with propylene oxide and having an hydroxyl number of about 640 and then combined with about 45 parts of trichlorofluoromethane, about 100 parts of the crude 4,4'-diphenyl methane diisocyanate mixture of Example 2, about 2 parts of N-ethyl morpholine, about 1 part of 1-methyl-4-dimethyl amino ethyl piperazine and about 2 parts of the silicone oil of Example 1 on a machine mixer as disclosed in Example 1. The resulting cellular polyurethane plastic has a density of about 1.5 lbs./ft.$^3$ and the following physical properties.

| | |
|---|---|
| Tensile strength _____ p.s.i.__ | 19.7 |
| K factor _____ | .139 |
| Closed cells _____ percent__ | 91.7 |
| Compressive strength: | |
|     At 5% deflection _____ lbs./in.$^2$__ | 8.2 |
|     At yield (7% deflection) _____ lbs./in.$^2$__ | 11.7 |

Example 6

About 80 parts of the hydroxyl polyether-ester of Example 3 are mixed with about 20 parts of N,N,N',N'-tetrakis-2-hydroxypropyl ethylene diamine, about 96 parts of crude 4,4'-diphenyl methane diisocyanate of Example 2, about 3 parts of water, about 2 parts of the silicone oil of Example 1, about 0.5 part of 1-methyl-4-dimethyl amino ethyl piperazine and about 0.1 part of stannous octoate on a machine mixer as disclosed in Example 1. The resulting cellular polyurethane has a density of about 2.5 lbs./ft.$^3$.

Example 7

About 70 parts of the hydroxyl polyether-ester of Example 3 are mixed with about 30 parts of N,N,N',N'-tetrakis-2-hydroxypropyl ethylene diamine and about 45 parts of trichlorofluoromethane and then reacted with about 93 parts of the crude 4,4'-diphenyl methane diisocyanate of Example 2 in the presence of about 1 part of 1-methyl-4-dimethyl amino ethyl piperazine and about 2 parts of the silicone oil of Example 1.

It is to be understood that the foregoing working examples are given for the purpose of illustration and that any other suitable rosin acid, polyhydric alcohol, organic polyisocyanate, catalyst, blowing agent, stabilizer or the like could have been used therein provided that the teachings of the disclosure are follower.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A polyurethane plastic obtained by a process which comprises reacting an organic polyisocyanate with an hydroxyl polyether-ester having a molecular weight of from about 614 to about 2200 prepared by a process which comprises reaction from about 1 to about 32 mols of an alkylene oxide with the esterification product of rosin acid with a polyhydric alcohol having 3 to 8 free hydroxyl groups, said rosin acid and said polyhydric alcohol being reacted in such relative proportions that said esterification product has at least two free hydroxyl groups.

2. The polyurethane plastic of claim 1 wherein said rosin acid is abietic acid.

3. The polyurethane plastic of claim 1 wherein said alkylene oxide contains from 2 to 5 carbon atoms.

4. The polyurethane plastic of claim 1 wherein said polyhydric alcohol has from 4 to 6 hydroxyl groups.

5. The polyurethane plastic of claim 1 wherein said reaction is carried out in the presence of a blowing agent to prepare a cellular polyurethane plastic.

6. The cellular polyurethane plastic of claim 5 wherein said hydroxyl polyether-ester is mixed with up to an equal amount of a polyhydroxyl compound having a molecular weight of from about 500 to about 10,000 and containing at least two free hydroxyl groups.

7. The cellular polyurethane plastic of claim 5 wherein said hydroxyl polyether-ester is mixed with up to an equal amount of an alkylene oxide condensate of an alkylene diamine, said condensate having a molecular weight of from about 500 to about 2,000 and containing at least three free hydroxyl groups.

8. A cellular polyurethane plastic obtained by a process which comprises reacting a crude mixture prepared by a process which comprises condensing aniline with formaldehyde and then phosgenating the resulting mixture of amines to obtain a mixture of organic polyisocyanates having from about 26 to about 33% free —NCO groups and having an amine equivalent of from 120 to about 160 with an hydroxyl polyether-ester prepared by a process which comprises reacting propylene oxide with the esterification product of abietic acid with a polyhydric alcohol having from 4 to 6 free hydroxyl groups.

9. The cellular polyurethane plastic of claim 8 wherein said polyhydric alcohol is pentaerythritol.

References Cited by the Examiner

UNITED STATES PATENTS

| | | | |
|---|---|---|---|
| 2,590,910 | 4/1952 | Wittcoff et al. | 260—104 |
| 2,864,810 | 12/1958 | Batdorf | 260—104 |
| 3,004,939 | 10/1961 | Varvaro | 260—77.5 |
| 3,095,386 | 6/1963 | Hudson | 260—2.5 |

FOREIGN PATENTS 221,411 5/1959 Australia.

LEON J. BERCOVITZ, *Primary Examiner.*

DONALD E. CZAJA, *Examiner.*